United States Patent
Benz et al.

(10) Patent No.: US 7,513,118 B2
(45) Date of Patent: Apr. 7, 2009

(54) METHOD FOR OPERATING A GAS TURBINE AND A GAS TURBINE FOR IMPLEMENTING THE METHOD

(75) Inventors: Eribert Benz, Birmenstorf (CH); Manfred Wirsum, Baden-Daettwil (CH)

(73) Assignee: ALSTOM Technology Ltd., Baden (CH)

( * ) Notice: Subject to any disclaimer, the term of this patent is extended or adjusted under 35 U.S.C. 154(b) by 431 days.

(21) Appl. No.: 11/275,480

(22) Filed: Jan. 9, 2006

(65) Prior Publication Data

US 2007/0039468 A1 Feb. 22, 2007

Related U.S. Application Data

(60) Provisional application No. 60/706,775, filed on Aug. 10, 2005.

(51) Int. Cl.
*F02C 6/10* (2006.01)
*F02C 3/28* (2006.01)
(52) U.S. Cl. .................................. 60/772; 60/39.12
(58) Field of Classification Search ............... 60/722, 60/772, 39.181, 39.12, 39.182, 728
See application file for complete search history.

(56) References Cited

U.S. PATENT DOCUMENTS

| | | | |
|---|---|---|---|
| 1,589,704 A | | 6/1926 | Kenworthy |
| 4,261,167 A | * | 4/1981 | Paull et al. ............... 60/781 |
| 4,488,398 A | | 12/1984 | Noguchi |
| 4,785,621 A | * | 11/1988 | Alderson et al. ........ 60/39.12 |
| 4,785,622 A | | 11/1988 | Plumley et al. |

(Continued)

FOREIGN PATENT DOCUMENTS

DE 947843 8/1956

(Continued)

OTHER PUBLICATIONS

Mukherjee, D., "State-of-the-art gas turbines—a brief update," ABB Review 1997:4-14;vol. 2; ABB Asea Brown Boveri Ltd., Zurich, Switzerland.

(Continued)

*Primary Examiner*—Frank M Lawrence
(74) *Attorney, Agent, or Firm*—Cermak Kenealy Vaidya & Nakajima LLP; Adam J. Cermak

(57) ABSTRACT

In a method for operating a gas turbine (11) in a combined cycle power plant (40), air is drawn in through the gas turbine (11), compressed, and the compressed air is led to a combustor (18, 19) to burn a syngas that is recovered from coal, whereby a portion of the compressed air is separated into oxygen and nitrogen. An improved degree of efficiency is achieved by virtue of the fact that a gas turbine (11) with reheating is used, which includes two combustors (18, 19) and two turbines (16, 17), whereby in the first combustor (18) syngas is burned with the compressed air and the resultant hot gases are expanded in the first turbine (16). In the second combustor, syngas is burned with the gases coming from the first turbine (16) and the resultant hot gases are expanded in the second turbine (17) and the generation of the syngas is undertaken in such a manner that the syngas that is generated can be led directly to the first combustor (18).

12 Claims, 2 Drawing Sheets

U.S. PATENT DOCUMENTS

| | | | |
|---|---|---|---|
| 4,896,499 | A | 1/1990 | Rice |
| 4,986,499 | A | 1/1991 | Ponticelli |
| 5,081,845 | A | 1/1992 | Allam et al. |
| 5,459,994 | A | 10/1995 | Drnevich |
| 5,577,378 | A | 11/1996 | Althaus et al. |
| 6,116,016 | A * | 9/2000 | Wada et al. .............. 60/39.17 |
| 6,487,863 | B1 | 12/2002 | Chen et al. |
| 6,513,317 | B2 | 2/2003 | Arar et al. |
| 2002/0077512 | A1 | 6/2002 | Tendick et al. |
| 2002/0148213 | A1 | 10/2002 | Yu |
| 2004/0168468 | A1 | 9/2004 | Peyron |
| 2007/0033918 | A1 | 2/2007 | Benz et al. |
| 2007/0033942 | A1 | 2/2007 | Benz et al. |
| 2007/0033943 | A1 | 2/2007 | Benz et al. |

FOREIGN PATENT DOCUMENTS

| | | |
|---|---|---|
| DE | 2503193 | 7/1976 |
| EP | 0622535 | 11/1994 |
| EP | 0634562 | 1/1995 |
| EP | 0773416 | 5/1997 |
| EP | 0795685 | 9/1997 |
| EP | 1098077 | 5/2001 |
| GB | 2335953 | 10/1999 |
| JP | 08218891 | 8/1996 |
| JP | 11030131 | 7/1997 |
| NL | 63476 | 6/1949 |
| WO | WO00/75499 | 12/2000 |

OTHER PUBLICATIONS

Search Report for Swiss Patent App. No. CH 20232005 (Apr. 5, 2005).

International Search Report for PCT Patent App. No. PCT/EP2006/065110 (Nov. 13, 2006).

Pending Claims from U.S. Appl. No. 11/275,477 as of Nov. 12, 2008, pp. 1-4.

Pending Claims from U.S. Appl. No. 11/275,478 as of Nov. 12, 2008, pp. 1-3.

Pending Claims from U.S. Appl. No. 11/275,479 as of Nov. 12, 2008, pp. 1-4.

Non-Final Office Action issued in U.S. Appl. No. 11/275,477 (Oct. 16, 2008).

Non-Final Office Action issued in U.S. Appl. No. 11/275,478 (Oct. 17, 2008).

Non-Final Office Action issued in U.S. Appl. No. 11/275,479 (Oct. 17, 2008).

* cited by examiner

METHOD FOR OPERATING A GAS TURBINE AND A GAS TURBINE FOR IMPLEMENTING THE METHOD

This application claims priority under 35 U.S.C. § 119 to U.S. provisional application No. 60/706,775, filed 10 Aug. 2005, the entirety of which is incorporated by reference herein.

BACKGROUND OF THE INVENTION

1. Field of the Invention

The present invention relates to the field of power plant technology. It pertains to a method for operating a (stationary) gas turbine, as well as a gas turbine for implementing the method.

2. Brief Description of the Related Art

A gas turbine with reheating (reheat gas turbine) is known (see, for example, the U.S. Pat. No. 5,577,378 or "State of the art gas turbines—a brief update," ABB Review February 1997, FIG. 15, turbine type GT26), which combines flexible operation with very low flue gas emission levels.

The machinery architecture of gas turbine type GT26 is unique and lends itself exceptionally well to the realization of a concept that is the subject matter of the present invention, because:

Even in the case of the compressor, there is a significant diversion of compressor air at intermediate compressor pressures, The concept of sequential combustion renders increased stability of combustion possible, with decreased levels of excess oxygen, and A secondary air system is present, which renders it possible to divert air from the compressor, to cool down, and to use the cooled air to cool the combustor and the turbine.

The principle of the known gas turbine with reheating is shown in FIG. 1. The gas turbine 11, which is a portion of the combined cycle power plant 10, includes two compressors, one connected behind the other, on a shaft 15 that is shared in common, namely a low pressure compressor 13 and a high pressure compressor 14, as well as two combustors, namely a high pressure combustor 18 and a reheat combustor 19, and pertinent turbines, namely a high pressure turbine 16 and a low pressure turbine 17. Shaft 15 drives a generator 12.

The way in which the unit works is the following: air is drawn in via an air inlet 20 by the low pressure compressor 13 and initially compressed to an intermediate level of pressure (ca. 20 bar). The high pressure compressor 14 then compresses the air further to a level of high pressure (ca. 32 bar). Cooling air is diverted, both at the intermediate level of pressure and at the level of high pressure, and cooled in pertinent OTC coolers (OTC=Once Through Cooler) 23 and 24 and conducted to the combustors 18 and 19 and turbines 16, 17 for cooling purposes via cooling lines 25 and 26. The remaining air from the high pressure compressor 14 is led to the high pressure combustor 18 and heated there by the combustion of a fuel brought in via the fuel feedline 21. The resultant flue gas is then expanded to an intermediate pressure level in the downstream high pressure turbine 16, as it performs work. After the expansion, the flue gas is heated again in the reheat combustor 19 by the combustion of a fuel led in via the fuel inlet 22, before it is expanded in the downstream low pressure turbine 17, performing additional work in the process.

The cooling air, which flows through the cooling lines 25, 26, is sprayed in at suitable points of the combustors 18, 19 and turbines 16, 17 to limit the material temperatures to a reasonable degree. The flue gas coming from the low pressure turbine 17 is sent through a heat recovery steam generator (HRSG) 27 to generate steam, which flows within a water-steam circuit through a steam turbine 29, performing additional work there. After flowing through the heat recovery steam generator 27, the flue gas is finally given off to the outside through a flue gas line 28. The OTC coolers 23, 24 are a portion of the water-steam circuit; superheated steam is generated at their outlets.

Great operational flexibility is achieved as a result of both combustions in combustors 18 and 19, which are independent of one another and follow one another sequentially; the combustor temperatures can be adjusted in such a manner that the maximal degree of efficiency is achieved within the existing limits. The low flue gas levels of the sequential combustion system are assured by the inherently low emission levels that can be achieved in conjunction with the reheating (under certain conditions, the second combustion even leads to a consumption of NOx).

On the other hand, combined cycle power plants with single-stage combustion in the gas turbines are known (see, for example, the U.S. Pat. Nos. 4,785,622 or 6,513,317), in which a coal gasifier is integrated, in order to provide the fuel that is necessary for the gas turbine in the form of syngas, which is recovered from coal. Such combined cycle power plants are characterized as IGCC plants (IGCC=Integrated Gasification Combined Cycle).

Now, the present invention proceeds from the knowledge that as a result of the use of gas turbines with reheating in an IGCC unit, the advantages of this type of gas turbine can be made usable for the unit in a particular manner.

SUMMARY OF THE INVENTION

One aspect of the present invention includes a method for operating a gas turbine that works together with a coal gasifier, which is characterized by an improved degree of efficiency, which can, in addition, be realized to particularly good effect using available components, and to create a gas turbine for implementing the method.

It is particularly advantageous that a gas turbine with reheating, which comprises two combustors and two turbines, be used in a gas turbine unit that works with syngas from a coal gasifier, in which, in the first combustor, syngas is burned using the compressed air, and the resultant hot gases are expanded in the first turbine, and in which syngas is burned in the second combustor, using the gases that come from the first turbine, and the resultant hot gases are expanded in the second turbine and the generation of the syngas is conducted in such a manner that the syngas that is produced can be led directly to the first combustor.

Exemplary embodiments of the method according to the invention are characterized in that the separation of the air is undertaken at pressures >40 bar, or the gasification of the coal is undertaken at pressures >40 bar, or that gas that occurs in conjunction with the gasification of the coal is subjected to a filtration of the gas at pressures >40 bar, or $CO_2$ is removed from the gas that occurs in the gasification of the coal, and the withdrawal of the $CO_2$ is undertaken at pressures >40 bar.

Exemplary embodiments of a gas turbine according to the invention are characterized in that the syngas generation unit comprises an air separation unit and the air separation unit works at pressures >40 bar, or that the syngas generation unit comprises a coal gasifier and the coal gasifier works at pressures >40 bar, or that the syngas generation unit comprises a filtration unit and the filtration unit works at pressures >40 bar, or that the syngas generation unit comprises a $CO_2$ separator and that the $CO_2$ separator works at pressures >40 bar.

BRIEF DESCRIPTION OF THE DRAWINGS

In what follows, the invention will be explained by virtue of embodiment examples in conjunction with the drawings.

DETAILED DESCRIPTION OF EXEMPLARY EMBODIMENTS

Figure 1:
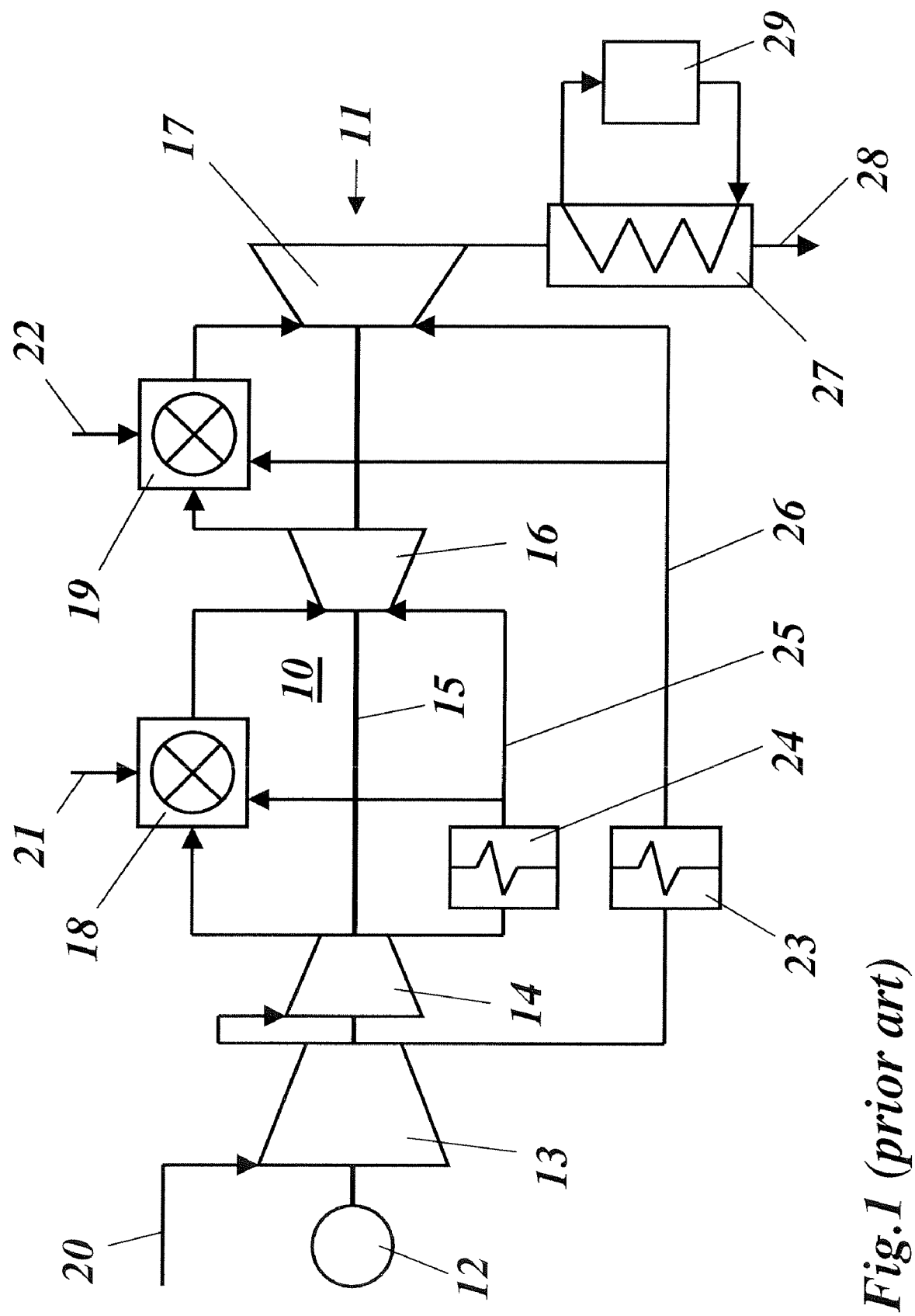
FIG. 1 shows the simplified schematic of a combined cycle power plant with a gas turbine with reheating or sequential combustion in accordance with the prior art.

In a gas turbine with reheating, as represented by Type GT26, and in FIG. 1, air is removed at the compressor 13, 14 at intermediate pressures (11-20 bar) and at high pressures (>30 bar).

The first combustor 18 requires syngas at a pressure that corresponds to the final pressure of the compressor 13, 14 plus a loss of pressure in the lines and in the combustor. In an IGCC plant of the customary type having a gas turbine with only one combustor, the pressure in the coal gasifier is about 30 bar. If, instead of the gas turbine with only one combustor, a gas turbine with reheating were used, the syngas from the coal gasifier would have to be compressed from the final pressure of the coal gasifier (ca. 30 bar) to the pressure level of the first combustor, of >45 bar, by means of one or more compressors.

If, on the other hand, one were to increase the pressure in the coal gasifier for a gas turbine without reheating to 60 bar, for example, an expansion machine would have to be used to expand the syngas to the combustor's level of pressure.

One aspect of the present invention includes operating the coal gasifying branch of the unit in an IGCC unit with a gas turbine with reheating, which commonly includes an air separation unit, a coal gasifier, a gas filtering unit, and a $CO_2$ separator, at a level of pressure that is adjusted to the level of pressure of the first combustor of the gas turbine and lies within the range of between 40 and 65 bar, thus clearly above the level of pressure in a gas turbine without reheating. In this way, the use of an additional compressor for the compression of the syngas is avoided.

Figure 2:
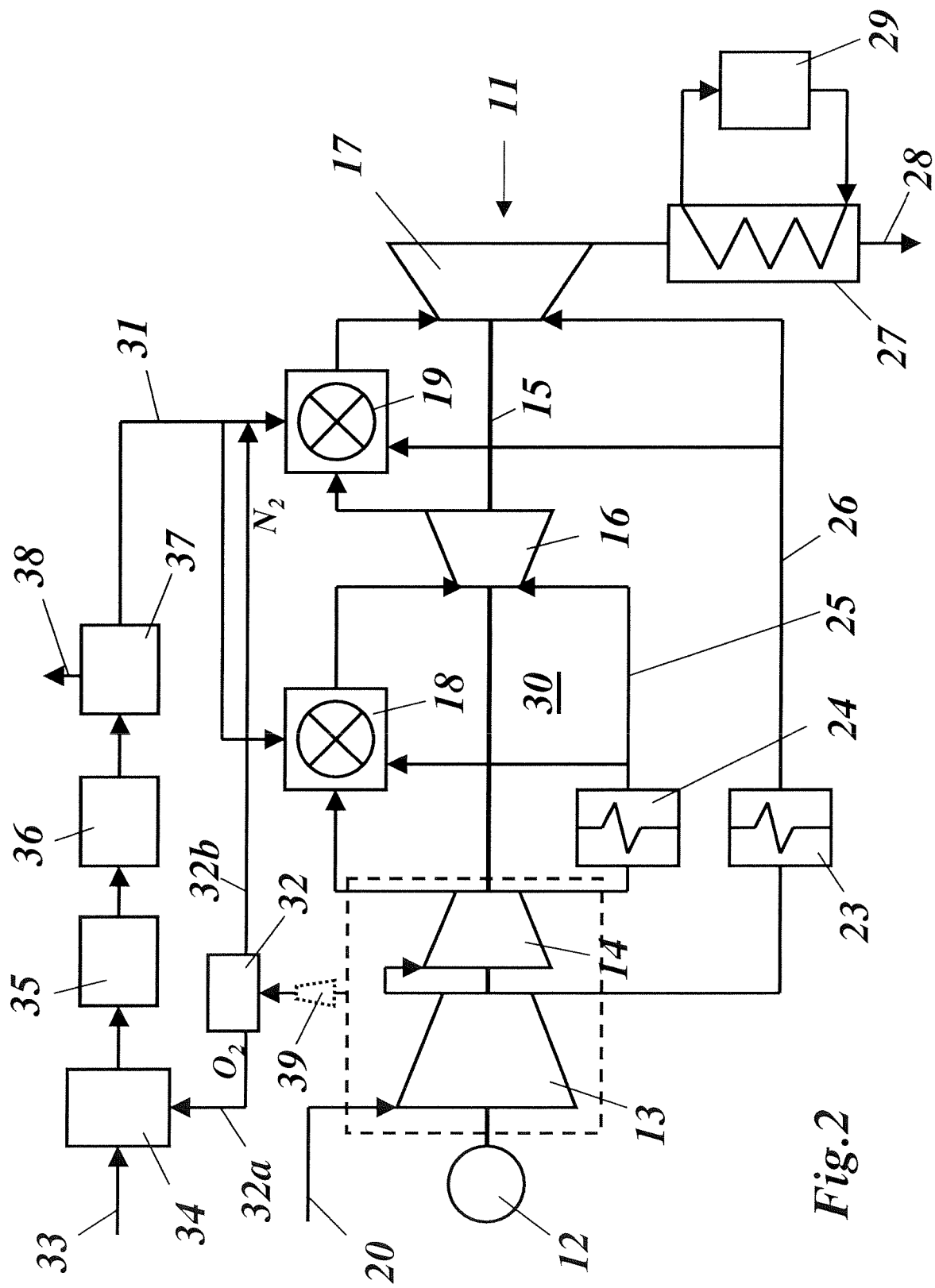
FIG. 2 shows the simplified schematic of an IGCC unit with a gas turbine with reheating or sequential combustion, respectively, according to an embodiment example of the invention.

An IGCC unit with a gas turbine with reheating or sequential combustion according to one embodiment example of the invention is depicted in FIG. 2, in a markedly simplified schematic. Combined cycle power plant 30 includes a gas turbine 11 with a low pressure compressor 13, a downstream high pressure compressor 14, a high pressure combustor 18 with a downstream high pressure turbine 16, and a reheat combustor 19 with a downstream low pressure turbine 17. The compressors 13, 14 and the turbines 16, 17, sit on a commonly shared shaft 15, which drives a generator 12. The combustors 18 and 19 are supplied, via a syngas feed line, 31 with syngas as a fuel, which is generated by gasifying coal (coal feeding 33) in a coal gasifier 34. The coal gasifier 34 is topped by a cooler 35 for the syngas, a filtering device 36, and a $CO_2$ separator 37 with a $CO_2$ outlet 38 to release the separated $CO_2$.

Oxygen ($O_2$), which is recovered in air separation unit 32 and introduced via an oxygen line 32a, is used to gasify the coal in the coal gasifier 34. The air separation unit 32 receives compressed air from the compressor 13, 14. The nitrogen ($N_2$), which also occurs in the course of the separation, is conducted via nitrogen line 32b, for example, to the low pressure combustor 19.

To cool the components of the combustors 18, 19, and turbines 16, 17 that have been exposed to hot gas, compressed air is drawn off at the outlets of both compressors 13 and 14, cooled off in a topped OTC cooler 23 or 24, and then led to the points to be cooled via corresponding cooling lines 25 and 26.

A heat recovery steam generator 27, which, together with a connected steam turbine 29, is a portion of a water-steam circuit, is connected at the outlet of the low pressure turbine 17. The flue gas that is emitted from the heat recovery steam generator 27 is released to the outside via a flue gas line 28.

Now, in such a configuration of the unit, the branch of the unit for generating the syngas, which includes the air separation unit 32, the coal gasifier 34, the filtering unit 36, and the $CO_2$ separator 37, is designed and operated in such a way that the resultant syngas can be led directly to the first combustor 18. To this end, either the air separator 32 or the coal gasifier 34, or the filtering unit 36 or the $CO_2$ separator 37 can work at pressures>40 bar. To bring the gases that flow through this branch of the unit to the requisite level of pressure, an additional compressor 39 can be provided at a suitable point.

LIST OF REFERENCE SIGNS 10,30,40 combined cycle power plant
11 gas turbine
12 generator
13 low pressure compressor
14 high pressure compressor
15 shaft (gas turbine)
16 high pressure turbine
17 low pressure turbine
18 high pressure combustor
19 reheat combustor
20 air inlet
21,22 fuel feedline
23,24 OTC cooler
25,26 cooling line
27 heat recovery steam generator
28 flue gas line
29 steam turbine (steam cycle)
31 syngas feed line
32 air separation unit
32a oxygen line
32b nitrogen line
33 coal feeding
34 coal gasifier
35 cooling device
36 filtering device
37 $CO_2$ separator
38 $CO_2$ outlet
39 compressor While the invention has been described in detail with reference to exemplary embodiments thereof, it will be apparent to one skilled in the art that various changes can be made, and equivalents employed, without departing from the scope of the invention.

The invention claimed is:

1. A method for operating a gas turbine, the method comprising:
   drawing in air though and compressing air in the gas turbine;
   conducting compressed air to a combustor;
   combusting a syngas that is recovered from coal with said compressed air in said combustor, to produce hot gases;
   expanding the hot gases from said combustor in a downstream turbine as said hot gases perform work;

separating a portion of said compressed air into oxygen and nitrogen;

generating syngas in a coal gasifier using the oxygen from said separating;

conducting a portion of said compressed air to and cooling portions of the gas turbine that are exposed to hot air with said compressed air;

wherein said gas turbine comprises a reheating gas turbine which comprises two combustors and two turbines;

wherein combusting a syngas comprises combusting syngas in the first combustor with the compressed air at pressures within the range of 40-65 bar;

wherein expanding the hot gases from said combustor comprises expanding in the first turbine;

combusting syngas in the second combustor using gases coming from the first turbine, to generate hot gases;

expanding the hot gases from said second combustor in the second turbine; and wherein generating syngas comprises generating syngas suitable to be led directly to the first combustor.

2. A method according to claim 1, wherein separating a portion of said compressed air comprises separating at pressures >40 bar.

3. A method according to claim 1, wherein generating syngas with coal comprises generating syngas at pressures >40 bar.

4. A method according to claim 1, wherein generating syngas comprises gasifying coal to produce gas and filtering said gas at pressures >40 bar.

5. A method according to claim 1, wherein generating syngas comprises gasifying coal to produce gas and $CO_2$, and withdrawing $CO_2$ is at pressures >40 bar.

6. A reheating gas turbine comprising:
compressors for the compression of air that has been drawn in;
a first turbine and a second turbine;
a first combustor and a second combustor, said first combustor in fluid communication with at least one of said compressors and with said first turbine, said second combustor in fluid communication with said first turbine and said second turbine;
wherein the first combustor is configured and arranged to combust a fuel with compressed air from said at least one of said compressors at pressures within a range of 40-65 bar, to generate hot gases;
wherein said first turbine is configured and arranged to expand hot gases from said first combustor;
wherein the second combustor is configured and arranged to combust a fuel with gases from the first turbine, to generate hot gases;
wherein the second turbine is configured and arranged to expand hot gases from said second combustor;
a coal gasification syngas generation unit comprising an air separation unit, which receives compressed air from the compressors and having an outlet connected with the combustors configured and arranged to supply the combustors with syngas as fuel; and
wherein the coal gasification syngas generation unit outlet is directly fluidly connected to the first combustor.

7. A gas turbine according to claim 6, wherein the coal gasification syngas generation unit comprises an air separation unit which functions at pressures >40 bar.

8. A gas turbine according to claim 6, wherein the coal gasification syngas generation unit comprises a coal gasifier which functions at pressures >40 bar.

9. A gas turbine according to clam 6, wherein the coal gasification syngas generation unit comprises a filtering unit which functions at pressures >40 bar.

10. A reheating gas turbine comprising:
compressors for the compression of air that has been drawn in;
a first turbine and second turbine;
a first combustor and a second combustor, said first combustor in fluid communication with at least one of said compressors and with said first turbine, said second combustor in fluid communication with said first turbine and said second turbine;
wherein the first combustor is configured and arranged to combust a fuel with compressed air from said at least one of said compressors at pressures within a range of 40-65 bar, to generate hot gases;
wherein said first turbine is configured and arranged to expand hot gases from said first combustor;
wherein the second combustor is configured and arranged to combust a fuel with gases from the first turbine, to generate hot gases;
wherein the second turbine is configured and arranged to expand hot gases from said second combustor;
a coal gasification syngas generation unit having an outlet connected with the combustors configured and arranged to supply the combustors with syngas as fuel;
wherein the coal gasification syngas generation unit outlet is directly fluidly connected to the first combuster, and
wherein the coal gasification syngas generation unit comprises a $CO_2$ separator which functions at pressures >40 bar.

11. A method according to claim 1, wherein the gas turbine is part of a combined cycle power plant.

12. A gas turbine according to claim 6, further comprising:
an additional compressor between the compressors of the gas turbine and the outlet of the coal gasification syngas generation unit.

* * * * *